US010573015B2

(12) United States Patent
Fukunishi et al.

(10) Patent No.: US 10,573,015 B2
(45) Date of Patent: Feb. 25, 2020

(54) MEASURING DEVICE AND OPERATING METHOD OF MEASURING DEVICE

(71) Applicant: OLYMPUS CORPORATION, Tokyo (JP)

(72) Inventors: Munenori Fukunishi, Tokyo (JP); Hideaki Takahashi, Tokyo (JP); Junichi Mori, Tokyo (JP); Naoyuki Miyashita, Tokorozawa (JP); Kiyotomi Ogawa, Tokyo (JP); Yohei Sakamoto, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/860,721

(22) Filed: Jan. 3, 2018

(65) Prior Publication Data

US 2018/0197306 A1    Jul. 12, 2018

(30) Foreign Application Priority Data

Jan. 11, 2017 (JP) .................................. 2017-002461

(51) Int. Cl.
G06T 7/593 (2017.01)
H04N 5/225 (2006.01)
G06T 7/73 (2017.01)
G02B 23/24 (2006.01)
H04N 5/232 (2006.01)
(Continued)

(52) U.S. Cl.
CPC .......... *G06T 7/593* (2017.01); *G02B 23/2415* (2013.01); *G02B 23/2484* (2013.01); *G06T 7/246* (2017.01); *G06T 7/74* (2017.01); *H04N 5/2254* (2013.01); *H04N 5/2258* (2013.01); *H04N 5/23267* (2013.01); *H04N 5/23293* (2013.01); *H04N 13/211* (2018.05); *H04N 13/225* (2018.05); *G06T 2207/10021* (2013.01);
(Continued)

(58) Field of Classification Search
None
See application file for complete search history.

(56) References Cited

U.S. PATENT DOCUMENTS 9,118,840 B2    8/2015   Fukunishi
2010/0208046 A1*  8/2010   Takahashi .......... A61B 1/00193
                                                        348/65
2012/0262553 A1* 10/2012   Chen .................. G01B 11/25
                                                        348/47

FOREIGN PATENT DOCUMENTS

JP    2004-049638 A    2/2004
JP    2010-128354 A    6/2010
(Continued)

*Primary Examiner* — Heather R Jones
(74) *Attorney, Agent, or Firm* — Scully, Scott, Murphy & Presser, P.C.

(57) ABSTRACT

In a measuring device, a second objective optical system is arranged to have a parallax with respect to a first objective optical system. An imaging unit captures a first subject image formed through the first objective optical system at a first imaging timing and captures a second subject image formed through the second objective optical system at a second imaging timing different from the first imaging timing. A virtual image generating unit generates a virtual image based on the first subject image acquired in a case in which the imaging unit is assumed to capture the first subject image at the second imaging timing. A measurement processing unit measures a shape of a subject on the basis of a second image based on the second subject image and the virtual image.

8 Claims, 14 Drawing Sheets

(51) Int. Cl.
*H04N 13/211* (2018.01)
*H04N 13/225* (2018.01)
*G06T 7/246* (2017.01)
*H04N 13/00* (2018.01)

(52) U.S. Cl.
CPC .............. *G06T 2207/10068* (2013.01); *H04N 2005/2255* (2013.01); *H04N 2013/0081* (2013.01)

(56) References Cited

FOREIGN PATENT DOCUMENTS

| | | |
|---|---|---|
| JP | 5744614 B2 | 7/2015 |
| JP | 2016-014896 A | 1/2016 |

\* cited by examiner

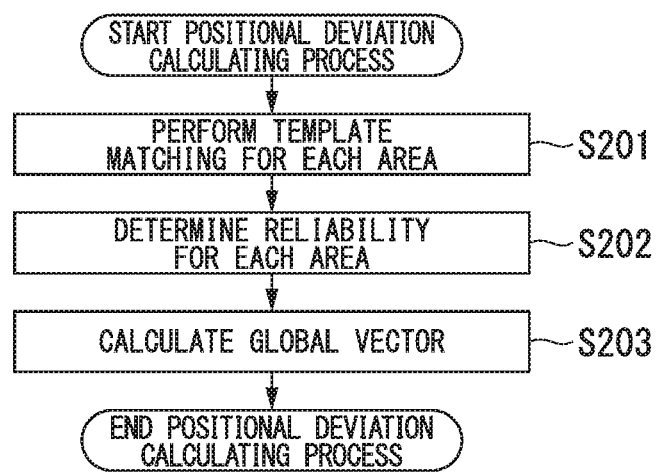

MEASURING DEVICE AND OPERATING METHOD OF MEASURING DEVICE

BACKGROUND OF THE INVENTION

Field of the Invention

The present invention relates to a measuring device and an operating method of a measuring device.

Priority is claimed on Japanese Patent Application No. 2017-002461, filed Jan. 11, 2017, the content of which is incorporated herein by reference.

Description of Related Art

In order to perform a nondestructive appearance test for damage and corrosion of the inside of an engine, a turbine, a chemical plant, and the like, industrial endoscopes are widely used. When defects such as damage and corrosion are found, it is necessary to switch between countermeasures in accordance with the degree thereof. For this reason, there are industrial endoscopes having a measuring function for measuring the magnitudes of damage and corrosion.

For example, as shown in Japanese Unexamined Patent Application, First Publication No. 2004-49638, a measurement endoscope device includes two optical systems having parallax. The measurement endoscope device simultaneously captures optical images acquired by the optical systems. The measurement endoscope device calculates the three-dimensional coordinates of a subject and the size of the subject on the basis of the principle of stereo measurement by using the two images that are generated.

A stereo measuring device disclosed in Japanese Unexamined Patent Application, First Publication No. 2010-128354 includes an optical system that forms two images of a subject formed by light passing through two different optical paths in a common area of imaging devices. The two different optical paths are referred to as a first optical path and a second optical path. In addition, the stereo measuring device includes an optical path switching means that performs switching between the optical paths to capture a subject image formed only by light passing through one of the two optical paths.

In a case in which measurement of a subject is performed using the stereo measuring device disclosed in Japanese Unexamined Patent Application, First Publication No. 2010-128354, an image (referred to as a first image) is generated through imaging based on a first subject image formed by light passing through the first optical path. Subsequently, the optical path is switched, and an image (referred to as a second image) is generated through imaging based on a second subject image formed by light passing through the second optical path. The shape of the subject is measured using the principle of stereo measurement on the basis of a parallax between the first image and the second image.

In a measurement endoscope device disclosed in Japanese Unexamined Patent Application, First Publication No. 2004-49638, two subject images formed by light passing through two optical paths are formed in different areas of an imaging device. In contrast to this, in the stereo measuring device disclosed in Japanese Unexamined Patent Application, First Publication No. 2010-128354, two subject images formed by light passing through two optical paths are formed in a common area of an imaging device. For this reason, in the stereo measuring device disclosed in Japanese Unexamined Patent Application, First Publication No. 2010-128354, the imaging area can be increased, and the quality of a captured image can be improved.

On the other hand, in the technology disclosed in Japanese Unexamined Patent Application, First Publication No. 2010-128354, as an endoscope moves while the first image and the second image are captured, an error occurs in a parameter (a baseline length or the like) of the stereo measurement. For this reason, the shape of the subject cannot be accurately measured. A technology for solving this is disclosed in Japanese Unexamined Patent Application, First Publication No. 2016-14896.

An endoscope device disclosed in Japanese Unexamined Patent Application, First Publication No. 2016-14896 alternately captures a first image and a second image. When a positional deviation amount between two first images or two second images is below a predetermined threshold, the endoscope device determines that there is no shaking of the device and performs a measurement process.

SUMMARY OF THE INVENTION

According to a first aspect of the present invention, a measuring device includes: a first objective optical system, a second objective optical system, an imaging unit, a virtual image generating unit, and a measurement processing unit. The second objective optical system is arranged to have a parallax with respect to the first objective optical system. The imaging unit is configured to capture a first subject image formed through the first objective optical system at a first imaging timing. The imaging unit is configured to capture a second subject image formed through the second objective optical system at a second imaging timing different from the first imaging timing. The imaging unit is configured to generate a first image based on the first subject image and generate a second image based on the second subject image. The virtual image generating unit is configured to generate a virtual image based on the first subject image acquired in a case in which the imaging unit is assumed to capture the first subject image at the second imaging timing. The measurement processing unit is configured to measure a shape of a subject on the basis of the second image and the virtual image.

According to a second aspect of the present invention, in the first aspect, the imaging unit may be configured to capture the first subject image at a plurality of first imaging timings that are different from each other and generate a plurality of the first images. The virtual image generating unit may include an image positional deviation calculating unit configured to calculate a positional deviation amount among the plurality of the first images and be configured to generate the virtual image on the basis of the calculated positional deviation amount.

According to a third aspect of the present invention, in the second aspect, the virtual image generating unit may further include a position estimating unit, a correction parameter calculating unit, and an image correcting unit. The position estimating unit may be configured to estimate an imaging position at the second imaging timing when the imaging unit captures the first subject image on the basis of the calculated positional deviation amount. The correction parameter calculating unit may be configured to calculate a correction parameter for the first image that is a correction target on the basis of the estimated imaging position. The image correcting unit may be configured to generate the virtual image by correcting the first image that is the correction target by using the calculated correction parameter.

According to a fourth aspect of the present invention, in the second aspect, the first images that are targets for calculating the positional deviation amount may be all or a part of the plurality of the first images.

According to a fifth aspect of the present invention, in the fourth aspect, the first images that are the targets for calculating the positional deviation amount may include at least one of the first image based on the first subject image captured at the first imaging timing immediately before the second imaging timing and the first image based on the first subject image captured at the first imaging timing immediately after the second imaging timing.

According to a sixth aspect of the present invention, in the second aspect, the measuring device may further include a memory storing the first images. The virtual image generating unit may further include a position estimating unit, a reading position calculating unit, and a reading control unit. The position estimating unit may be configured to estimate an imaging position at the second imaging timing when the imaging unit captures the first subject image on the basis of the calculated positional deviation amount. The reading position calculating unit may be configured to calculate a reading position at the time of reading the first image that is a reading target from the memory on the basis of the estimated imaging position. The reading control unit may be configured to control reading the first image that is the reading target from the memory on the basis of the calculated reading position.

According to a seventh aspect of the present invention, in the second aspect, the measuring device may further include a measurement determining unit configured to determine whether or not measurement can be performed on the basis of the positional deviation amount before the virtual image is generated. The virtual image generating unit may be configured to generate the virtual image in a case in which the measurement determining unit determines that the measurement can be performed.

According to an eighth aspect of the present invention, in the seventh aspect, the measurement determining unit may be configured to determine whether or not the measurement can be performed on the basis of at least one of a translational movement amount of the imaging unit based on the positional deviation amount, a value representing straight movement property of the imaging unit based on the positional deviation amount, and an amount of change of the positional deviation amount.

According to a ninth aspect of the present invention, there is provided an operating method of a measuring device including a first objective optical system, a second objective optical system arranged to have a parallax with respect to the first objective optical system, and an imaging unit. The operating method includes a first step, a second step, a third step, and a fourth step. The first step is a step of capturing a first subject image formed through the first objective optical system at a first imaging timing and generating a first image based on the first subject image by using the imaging unit. The second step is a step of capturing a second subject image formed through the second objective optical system at a second imaging timing different from the first imaging timing and generating a second image based on the second subject image by using the imaging unit. The third step is a step of generating a virtual image based on the first subject image acquired in a case in which the imaging unit is assumed to capture the first subject image at the second imaging timing. The fourth step is a step of measuring a shape of a subject on the basis of the second image and the virtual image.

BRIEF DESCRIPTION OF THE DRAWINGS

FIG. 4 is a flowchart showing the sequence of a positional deviation calculating process according to the first embodiment of the present invention.

DETAILED DESCRIPTION OF THE INVENTION

Hereinafter, embodiments of the present invention will be described with reference to the drawings.
(First Embodiment)

Figure 1:
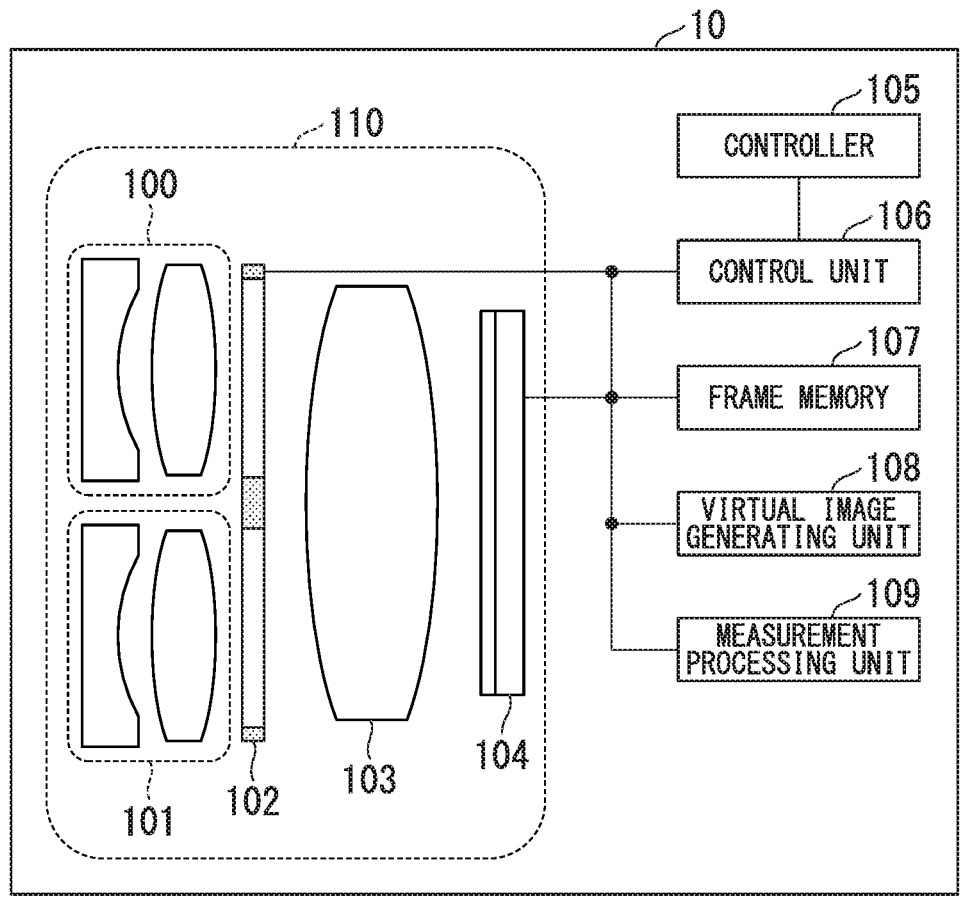
FIG. 1 is a block diagram showing the configuration of a measuring device according to a first embodiment of the present invention.

FIG. 1 shows the configuration of a measuring device 10 according to a first embodiment of the present invention. For example, the measuring device 10 is an endoscope device including an insertion unit to be inserted inside an object that is a measurement target. As shown in FIG. 1, the measuring device 10 includes a first objective optical system 100, a second objective optical system 101, an optical path switching unit 102, an image forming optical system 103, an imaging device 104 (imaging unit), a controller 105, a control unit 106, a frame memory 107 (memory), a virtual image generating unit 108, and a measurement processing unit 109.

For example, each of the first objective optical system 100 and the second objective optical system 101 includes an objective lens combining a concave lens and a convex lens. The second objective optical system 101 is arranged to have a parallax with respect to the first objective optical system 100. In other words, the first objective optical system 100 and the second objective optical system 101 are separated from each other in a parallax direction. The parallax direction is the direction of a straight line passing through the optical center (principal point) of the first objective optical system 100 and the optical center (principal point) of the second objective optical system 101. Light incident to the first objective optical system 100 passes through a first optical path. Light incident to the second objective optical system 101 passes through a second optical path different from the first optical path. The first objective optical system 100 forms a first subject image (first optical image of a subject), and the second objective optical system 101 forms a second subject image (second optical image of the subject).

The optical path switching unit 102 performs switching between the first optical path and the second optical path such that only one of the first subject image and the second subject image is formed at the imaging device 104. When the optical path switching unit 102 allows light of the first optical path to be transmitted, light of the second optical path is shielded. On the other hand, when the optical path switching unit 102 allows light of the second optical path to be transmitted, light of the first optical path is shielded. An optical path switching operation using the optical path switching unit 102 is controlled according to a control signal output from the control unit 106. The image forming optical system 103 forms a subject image based on one of light passing through the first optical path and light passing through the second optical path on the surface of the imaging device 104.

The imaging device 104 captures the first subject image formed through the first objective optical system 100 at a first imaging timing. The imaging device 104 captures the second subject image formed through the second objective optical system 101 at a second imaging timing different from the first imaging timing. The imaging device 104 generates a first image (first image signal) based on the first subject image. The imaging device 104 generates a second image (second image signal) based on the second subject image. The imaging device 104 captures first subject images at a plurality of first imaging timings which are different from each other, thereby generating a plurality of first images. The first objective optical system 100, the second objective optical system 101, the optical path switching unit 102, the image forming optical system 103, and the imaging device 104 configure a scope 110. For example, in the endoscope device, the scope 110 is arranged in the insertion unit.

The controller 105 is an operation unit operated by a user. The controller 105 receives instructions such as "imaging start", "measurement start", "imaging stop", and "acquisition of a measurement result" from a user. The controller 105 outputs a command according to an instruction received from the user to the control unit 106.

The command from the controller 105 is input to the control unit 106. The control unit 106 transmits a control signal corresponding to the command to each unit to be described later in accordance with the state of each unit, thereby controlling a series of process sequences for measuring a subject shape. The frame memory 107 stores the first image and the second image generated by the imaging device 104.

Each of the virtual image generating unit 108 and the measurement processing unit 109 is an arithmetic operation device (processor) configured as a central processing unit (CPU), a digital signal processor (DSP), a graphics processing unit (GPU), or the like. Each of the virtual image generating unit 108 and the measurement processing unit 109 may be configured by a logic circuit such as an application specific integrated circuit (ASIC), a field-programmable gate array (FPGA), or the like. The virtual image generating unit 108 generates a virtual image (virtual image signal) based on the first subject image acquired in a case in which the imaging device 104 is assumed to capture the first subject image at the second imaging timing. The measurement processing unit 109 measures the shape of a subject on the basis of the second image and the virtual image.

Figure 2:
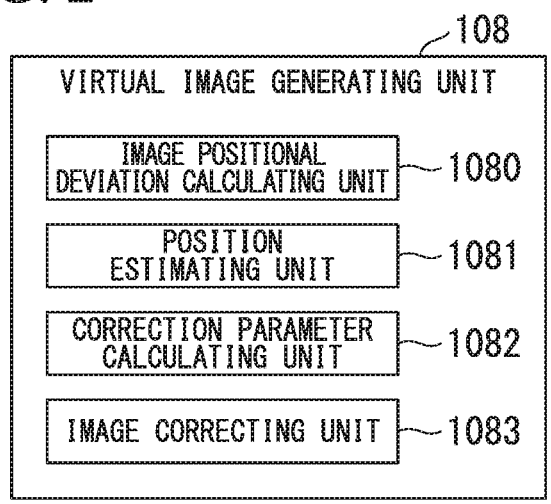
FIG. 2 is a block diagram showing the configuration of a virtual image generating unit included in the measuring device according to the first embodiment of the present invention.

FIG. 2 shows the configuration of the virtual image generating unit 108. As shown in FIG. 2, the virtual image generating unit 108 includes an image positional deviation calculating unit 1080, a position estimating unit 1081, a correction parameter calculating unit 1082, and an image correcting unit 1083.

The image positional deviation calculating unit 1080 calculates a positional deviation amount among a plurality of first images. Accordingly, the virtual image generating unit 108 can generate a virtual image on the basis of the calculated positional deviation amount. The position estimating unit 1081 estimates an imaging position (the position of the imaging device 104) at the second imaging timing when the imaging device 104 captures the first subject image on the basis of the calculated positional deviation amount. The correction parameter calculating unit 1082 calculates a correction parameter for the first image that is a correction target on the basis of the estimated imaging position. The image correcting unit 1083 generates a virtual image by correcting the first image that is a correction target by using the calculated correction parameter.

In each embodiment of the present invention, an imaging position for acquiring the first image will be referred to as an imaging position of the first image. In addition, an imaging position for acquiring the second image will be referred to as an imaging position of the second image.

Figure 3:
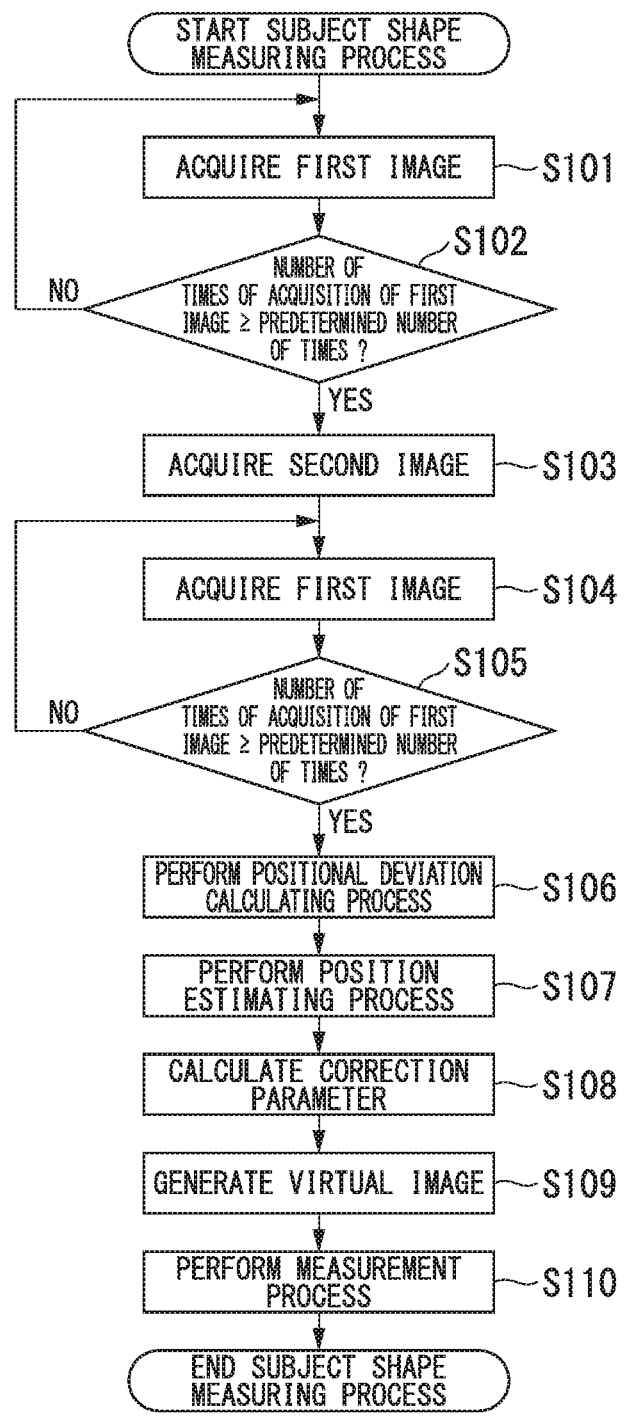
FIG. 3 is a flowchart showing the sequence of a subject shape measuring process according to the first embodiment of the present invention.

FIG. 3 shows the sequence of a subject shape measuring process according to the first embodiment. The subject shape measuring process will be described in detail with reference to FIG. 3.

After the subject shape measuring process is started, the optical path switching unit 102 sets the first optical path for the optical path. Accordingly, the first subject image based on light passing through the first objective optical system 100 is formed on the surface of the imaging device 104. The imaging device 104 captures the first subject image and generates a first image based on the first subject image. A timing at which the first subject image is captured is a first timing. The first image generated by the imaging device 104 is stored in the frame memory 107 (Step S101).

After Step S101, the control unit 106 determines whether or not the number of times of acquisition of the first image in Step S101 has reached a predetermined number of times (Step S102). The predetermined number of times is an integer of one or more. In Step S102, in a case in which the number of times of acquisition of the first image is smaller than the predetermined number of times, the process of Step S101 is performed again. In other words, the acquisition of the first image is performed until the number of times of acquisition of the first image reaches the predetermined number of times.

On the other hand, in a case in which the number of times of acquisition of the first image has reached the predetermined number of times in Step S102, the optical path switching unit 102 sets the second optical path for the optical path. Accordingly, a second subject image based on light passing through the second objective optical system 101 is formed on the surface of the imaging device 104. The imaging device 104 captures the second subject image and generates a second image based on the second subject image. A timing at which the second subject image is captured is a second timing The second image generated by the imaging device 104 is stored in the frame memory 107 (Step S103).

After Step S103, a process similar to the process of Step S101 is performed. In other words, the acquisition of the first image is performed (Step S104).

After Step S104, the control unit 106 determines whether or not the number of times of acquisition of the first image in Step S104 has reached a predetermined number of times (Step S105). The predetermined number of times is an integer of one or more. In Step S105, in a case in which the number of times of acquisition of the first image is smaller than the predetermined number, the process of Step S104 is performed again. In other words, the acquisition of the first image is performed until the number of times of acquisition of the first image reaches the predetermined number of times.

In Step S105, in a case in which the number of times of acquisition of the first image has reached the predetermined number of times, the image positional deviation calculating unit 1080 calculates a positional deviation amount among a plurality of first images (Step S106). The first images that are targets for the calculation of the positional deviation amount are all or a part of a plurality of first images generated in the process of Step S101 and Step S104. For example, in a case in which the process of each of Steps S101 and S104 is performed once, the first images that are targets for the calculation of the positional deviation amount are two first images generated in the process of Steps S101 and S104.

For example, the first images that are targets for the calculation of a positional deviation amount may include at least one of the first image based on the first subject image captured at the first imaging timing immediately before the second imaging timing and the first image based on the first subject image captured at the first imaging timing immediately after the second imaging timing. The first imaging timing immediately before the second imaging timing is a first imaging timing closest to the second imaging timing among first imaging timings before the second imaging timing. The first imaging timing immediately after the second imaging timing is a first imaging timing closest to the second imaging timing among first imaging timings after the second imaging timing. For example, the first images that are targets for the calculation of a positional deviation amount may include at least one first image generated in the process of Step S101 and at least one first image generated in the process of Step S104.

The subject shape measuring process may not include the processes of Steps S101 and S102. In such a case, the first images that are targets for the calculation of a positional deviation amount include at least two first images generated in the process of Step S104.

The subject shape measuring process may not include the processes of Steps S104 and S105. In such a case, the first images that are targets for the calculation of a positional deviation amount include at least two first images generated in the process of Step S101.

After Step S106, the position estimating unit 1081 estimates an imaging position at the second imaging timing when the imaging device 104 has captured the first subject image on the basis of the positional deviation amount calculated in Step S106 (Step S107). Since the first image and the second image are generated through imaging at mutually-different imaging timings, the first image is not generated at the second imaging timing. In Step S107, the position estimating unit 1081 estimates an imaging position in a case in which the imaging device 104 is assumed to have captured the first subject image at the second imaging timing.

After Step S107, the correction parameter calculating unit 1082 calculates a correction parameter for the first image that is a correction target on the basis of the imaging position estimated in Step S107 (Step S108).

After Step S108, the image correcting unit 1083 corrects the first image that is a correction target by using the correction parameter calculated in Step S108, thereby generating a virtual image. The generated virtual image is stored in the frame memory 107 and is output to the measurement processing unit 109 as necessary (Step S109).

After Step S109, the measurement processing unit 109 measures the shape of the subject on the basis of the second image and the virtual image and outputs a result of the measurement to the control unit 106 (Step S110). The measurement processing unit 109can measure the shape of the subject with desired accuracy by using the virtual image assumed to be acquired at the same imaging timing as the second imaging timing at which the second image is acquired. By performing the process of Step S110, the subject shape measuring process is completed.

FIG. 4 shows the sequence of a positional deviation calculating process of Step S106. The position deviation calculating process will be described in detail with reference to FIG. 4.

Two first images that are targets for the calculation of a positional deviation amount are input to the image positional deviation calculating unit 1080. The image positional deviation calculating unit 1080 performs template matching for each area by using the input two first images (Step S201).

Figure 5A:
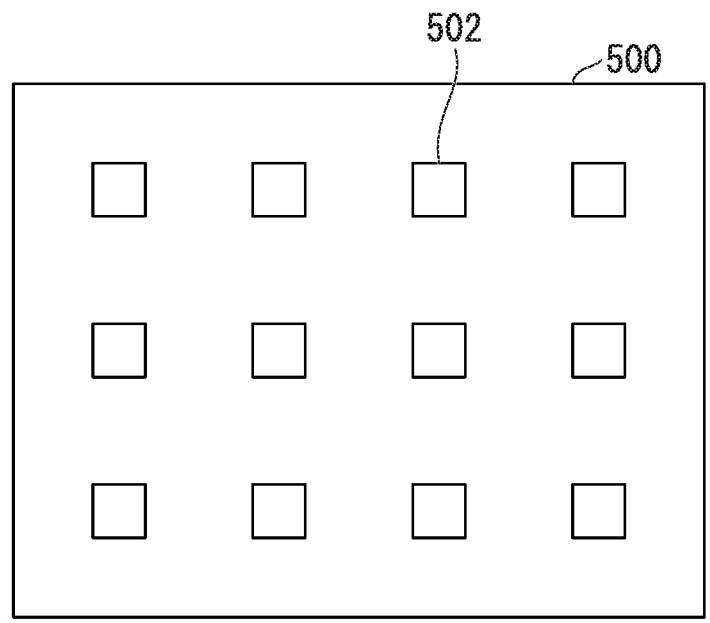
FIGS. 5A and 5B are reference diagrams showing images used for the positional deviation calculating process according to the first embodiment of the present invention.
Figure 5B:
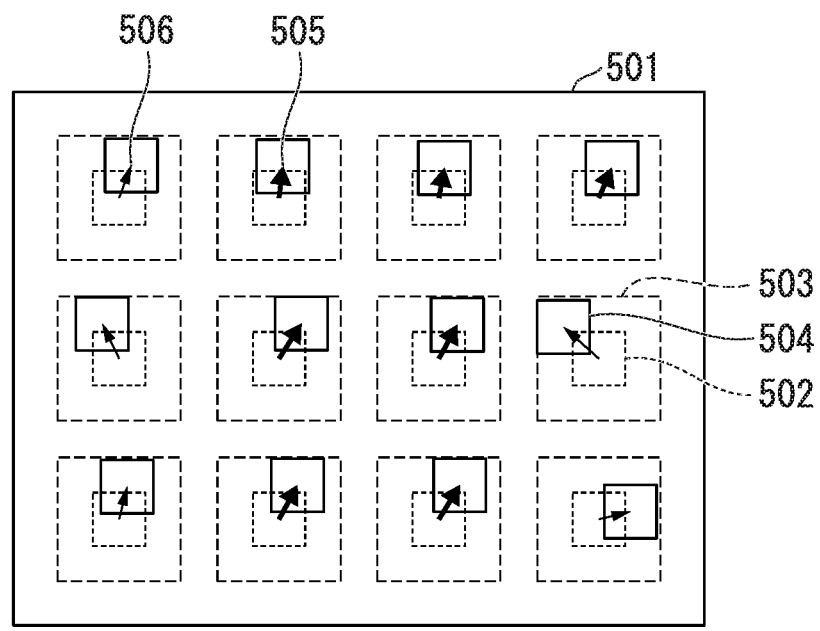

The process of Step S201 will be described in detail with reference to FIGS. 5A and 5B. The first image generated first earlier is a reference image 500 (FIG. 5A), and the first image generated later is a position alignment image 501 (FIG. 5B). However, the first image generated later may be a reference image 500, and the first image generated earlier may be a position alignment image 501.

In the reference image 500, template areas 502 are arranged at a predetermined interval. The image positional deviation calculating unit 1080 searches for an area of the position alignment image 501 that matches an image inside a template area 502. In the position alignment image 501, a matching search range 503 with a predetermined range having the position of the template area 502 of the reference image 500 as its center is set. The image positional deviation calculating unit 1080 calculates a matching position 504 inside the matching search range 503 at which the degree of matching between the matching search range 503 of the position deviation image 501 and the template area 502 of the reference image 500 is the highest. As an index representing this degree of matching, a known index such as Sum of Squared Difference (SSD), Sum of Absolute Difference (SAD), Normalized Cross Correlation (NCC), or Zero means Normalized Cross Correlation (ZNCC) can be used.

In Step S201, the image positional deviation calculating unit 1080 calculates a positional deviation between the matching position 504 of the position deviation image 501 and the position of each template area 502 of the reference image 500 as a motion vector of each template area 502. In the template matching process, in a case in which there is a way for uniquely acquiring a correspondence point, a motion vector having high reliability can be calculated. However, in a low-contrast area, a repeated pattern area, or the like in which there is no way for position alignment, the reliability of the motion vector is low. After Step S201, the image positional deviation calculating unit 1080 determines the reliability of the motion vector of each template area 502 (Step S202).

As a method of determining the reliability of a motion vector, for example, a known technique such as a technology disclosed in Japanese Patent No. 5744614 may be used. For example, in the case shown in FIG. 5B, the reliability of a motion vector 505 is high, and the reliability of a motion vector 506 is low. After Step S202, the image positional deviation calculating unit 1080 calculates an average of motion vectors, which have high reliability, calculated in Step S202 among motion vectors calculated in Step S201, thereby calculating a global vector (Step S203). At this time, the image positional deviation calculating unit 1080 may calculate the global vector only from motion vectors of a center area of the image. Alternatively, the image positional deviation calculating unit 1080 may calculate the global vector by calculating a weighted average using the value of the reliability as its weight. The magnitude of the global vector represents a positional deviation amount between two first images, and the direction of the global vector represents a direction of the positional deviation between the two first images. By performing the process of Step S203, the positional deviation calculating process is completed.

The position estimating process of Step S107 and the correction parameter calculating process of Step S108 will be described in detail with reference to FIGS. 6 and 7.

Figure 6:
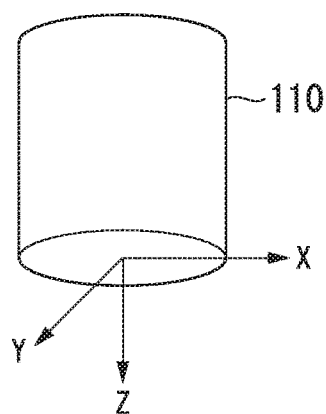
FIG. 6 is a reference diagram showing a coordinate system according to the first embodiment of the present invention.
Figure 7:
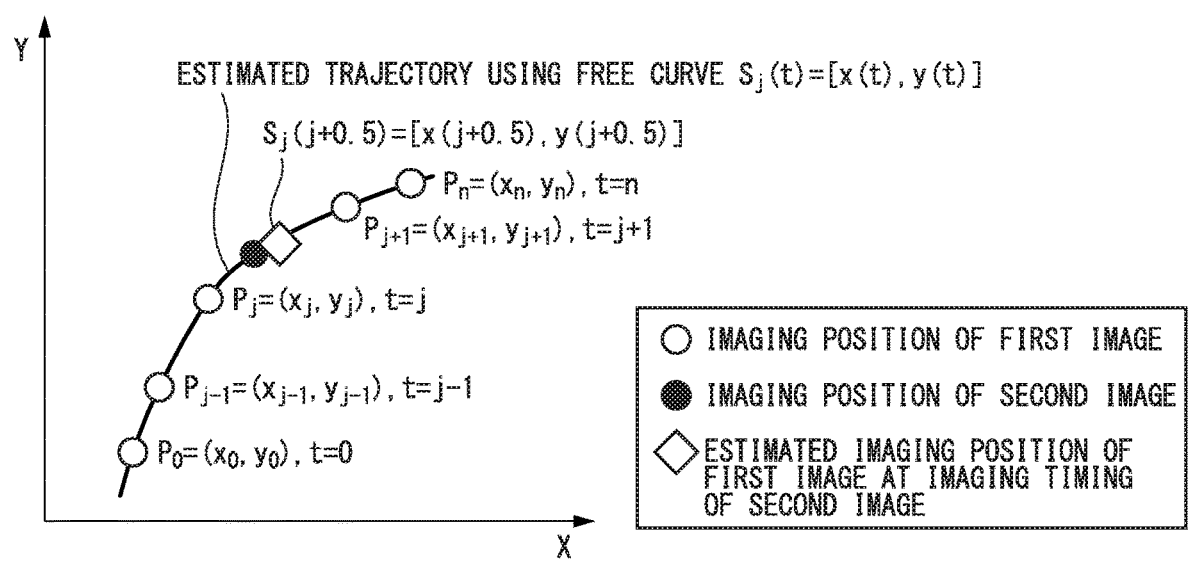
FIG. 7 is a reference diagram showing the trajectory of a scope according to the first embodiment of the present invention.

An X, Y, and Z coordinate system whose reference is the scope 110 is defined as shown in FIG. 6. In other words, the Z direction is the front face direction of the scope 110, in other words, the imaging direction of the imaging device 104. The X direction and the Y direction are perpendicular to the Z direction. FIG. 7 shows the trajectory of the scope 110 inside an XY plane. In a case in which the imaging position of a first image is defined as $(x_j, y_j)$ (j=0, 1, . . . , n), the position estimating unit 1081 calculates a virtual imaging position of the first image at the second imaging timing at which a second image is generated through free curve interpolation. Hereinafter, a case in which cubic spline interpolation is used will be described. By using a parameter t (0≤t≤n), a free curve is given using Equation (1). In Equation (1) $a_j$, $b_j$, $c_j$, and $d_j$ are coefficients.

$$S_j(t)=[x(t)y(t)]=a_j+b_j(t-t_j)+c_j(t-t_j)^2+d_j(t-t_j)^3 \quad (1)$$

Equations (2) and (3) are acquired on the condition that passing points are continuous.

$$S_j(t=j)=P_j=[x_j y_j] \quad (2)$$

$$S_j(t=j+1)=S_{j+1}(j+1)=P_{j+1}=[x_{j+1} y_{j+1}] \quad (3)$$

Equation (4) and Equation (5) are acquired on the condition that the slope of the section (first derivative) and a rate of change thereof (second derivative) are continuous.

$$S_j'(t=j+1)=S_{j+1}'(j+1) \quad (4)$$

$$S_j''(t=j+1)=S_{j+1}''(j+1) \quad (5)$$

In addition, Equation (6) is acquired on the condition that the second derivative of an end point is "0".

$$S_j''(0)=S_{j+1}''(n)=0 \quad (6)$$

By solving these for the coefficients $a_j$, $b_j$, and $d_j$, Equation (7), Equation (8), and Equation (9) are acquired.

$$a_j = P_j \quad (7)$$

$$b_j = a_{j+1} - a_j - \frac{(c_{j+1} + 2c_j)}{3} \quad (8)$$

$$d_j = \frac{(c_{j+1} + 2c_j)}{3} \quad (9)$$

Here, a coefficient $c_j$ is acquired by solving simultaneous equations represented in Equation (10).

$$\begin{bmatrix} 1 & 1 & 0 & 0 & \cdots & 0 & 0 & 0 \\ 1 & 4 & 1 & 0 & \cdots & 0 & 0 & 0 \\ 0 & 1 & 4 & 1 & \cdots & 0 & 0 & 0 \\ 0 & 0 & 1 & 4 & \cdots & 0 & 0 & 0 \\ \vdots & \vdots & \vdots & \vdots & \ddots & \vdots & \vdots & \vdots \\ 0 & 0 & 0 & 0 & \cdots & 4 & 1 & 0 \\ 0 & 0 & 0 & 0 & \cdots & 1 & 4 & 1 \\ 0 & 0 & 0 & 0 & \cdots & 0 & 1 & 1 \end{bmatrix} \begin{bmatrix} c_0 \\ c_1 \\ c_2 \\ c_3 \\ \vdots \\ c_{n-2} \\ c_{n-1} \\ 0 \end{bmatrix} = \begin{bmatrix} 0 \\ 3(a_2 - 2a_1 + a_0) \\ 3(a_3 - 2a_2 + a_1) \\ 3(a_4 - 2a_3 + a_2) \\ \vdots \\ 3(a_{n-1} - 2a_{n-2} + a_{n-3}) \\ 3(a_n - 2a_{n-1} + a_{n-2}) \\ 0 \end{bmatrix} \quad (10)$$

By using the calculation described above, the position estimating unit 1081 can calculate the coefficients $a_j$, $b_j$, $c_j$, and $d_j$ and can obtain a free curve $S_j(t)$.

The position estimating unit 1081 calculates the imaging position of the first image at the first imaging timing by calculating $S_j(t=j)$. In addition, the position estimating unit 1081 calculates the imaging position of the first image at the second imaging timing by calculating $S_j(t=j+0.5)$. The calculated imaging position ($S_j(t=j+0.5)$) is a virtual imaging position of the first image at the second imaging timing. The position estimating unit 1081 performs the above-described process in Step S107.

In Step S108, the correction parameter calculating unit 1082 calculates a difference between the imaging position of the first image at the first imaging timing and the imaging position of the first image at the second imaging timing. In this way, the correction parameter calculating unit 1082, as represented in Equation (11), calculates a correction parameter $V_j$.

$$V_j=S_j(t=j+0.5)-S_j(t=j)=[x(j+0.5)y(j+0.5)]-[x(t)y(t)] \quad (11)$$

In order to precisely express the actual phenomenon, a motion of the scope 110 in the Z-axis direction, rotation such as X-axis rotation, Y-axis rotation, and Z-axis rotation, and the like need to be considered. In motions of the scope 110 in a short time, motions of the X-axis direction and the Y-axis direction are dominant The motions of the scope 110 in the X-axis and Y-axis directions and motions on an image in the vertical and horizontal directions can be considered to have the relations of similarities. By using the global vector calculated in the process of Steps S201 to S203 as the value of $P_j$, the correction parameter calculating unit 1082 can calculate a correction parameter $V_j$ as the amount of correction on the image.

Here, while a cubic spline curve has been described as an example, the same effect can be acquired also in a case in which an arbitrary curve such as a B spline curve, N-th spline curve, or a Bezier curve is used.

Figure 8:
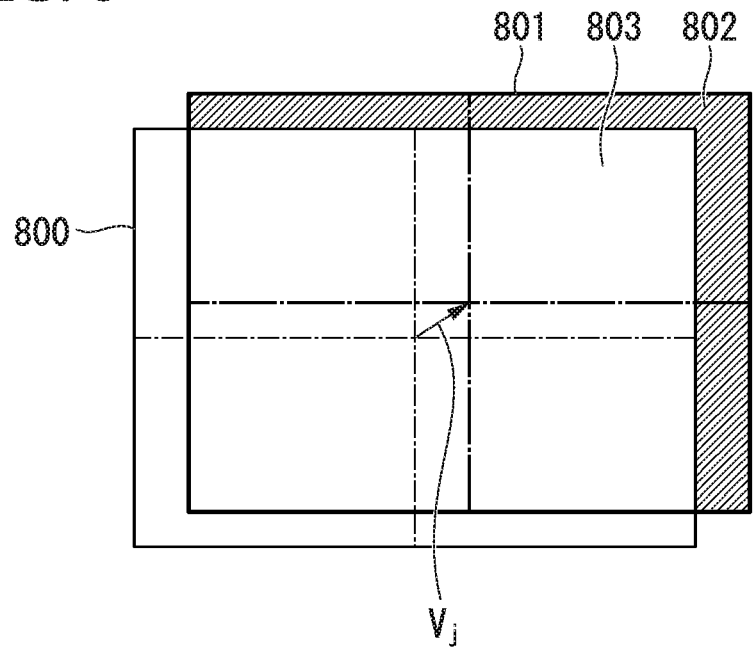
FIG. 8 is a reference diagram showing a virtual image generating process according to the first embodiment of the present invention.

The virtual image generating process of Step S109 will be described in detail with reference to FIG. 8. The image correcting unit 1083 corrects a first image 800 by shifting the coordinates of each pixel of the first image 800 acquired through imaging at the first imaging timing on the basis of the correction parameter $V_j$. In this way, the image correcting unit 1083 generates a virtual image 801. In the virtual image 801, data of an area 802 not overlapping the first image 800 may be predetermined data such as black data. Alternatively, the data of the area 802 may be interpolated using data of a common area 803 that is common between the first image 800 and the virtual image 801.

Figure 9:
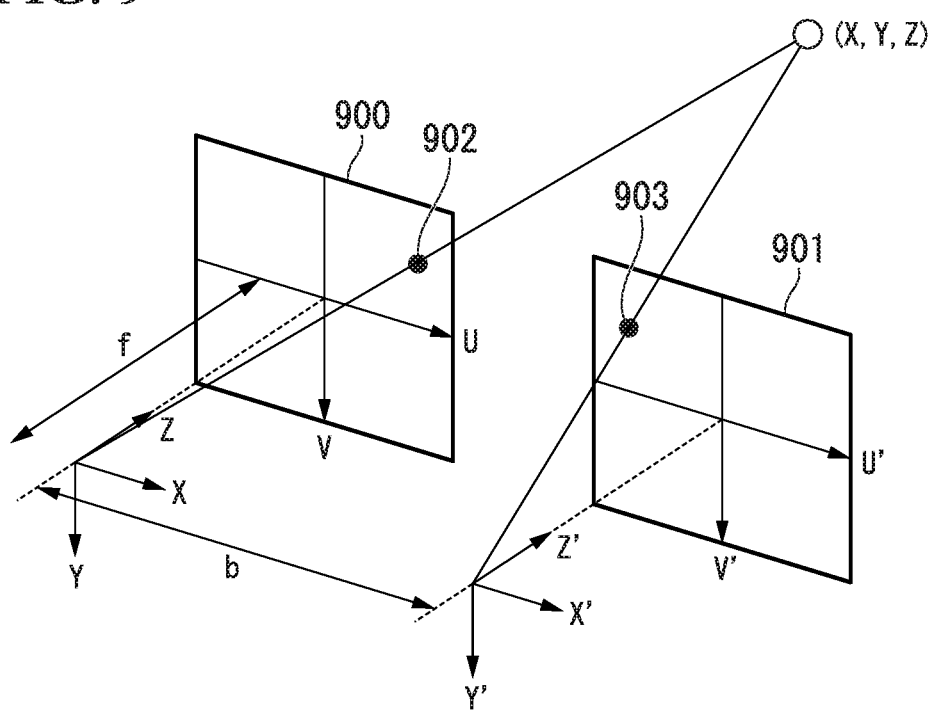
FIG. 9 is a reference diagram for showing a measuring process according to the first embodiment of the present invention.

The measurement process of Step S110 will be described in detail with reference to FIG. 9. The position of a subject that is a measurement target is (X, Y, Z). In FIG. 9, an XYZ coordinate system having the optical center of the second objective optical system 101 at the second imaging timing as its origin, and an X'Y'Z' coordinate system having the optical center of the first objective optical system 100 at the second imaging timing as its origin are shown. The position of the subject is represented as coordinates in the XYZ coordinate system. A position 902 of the subject in a UV coordinate system having the center of a second image 900 as its origin is (u, v), and a position 903 of the subject in a U'V' coordinate system having the center of a virtual image 901 as its origin is (u', v'). The measurement processing unit 109 performs stereo measurement by using the second image 900 and the virtual image 901.

A parallax d is given in Equation (12).

$$d = u - u' \quad (12)$$

The measurement processing unit 109, similar to general stereo measurement, can acquire the subject coordinates of an arbitrary measurement point by using Equation (13), Equation (14), and Equation (15). In each equation, b is a baseline length, in other words, a distance between the optical center of the first objective optical system 100 and the optical center of the second objective optical system 101. f is a focal distance. δ is a pixel pitch of the imaging device 104.

$$X = \frac{bu}{u - u'} = \frac{bu}{d} \quad (13)$$

$$Y = \frac{bv}{u - u'} = \frac{bv}{d} \quad (14)$$

$$Z = \frac{f}{\delta} \frac{b}{u - u'} = \frac{f \cdot b}{\delta \cdot d} \quad (15)$$

Figure 10:
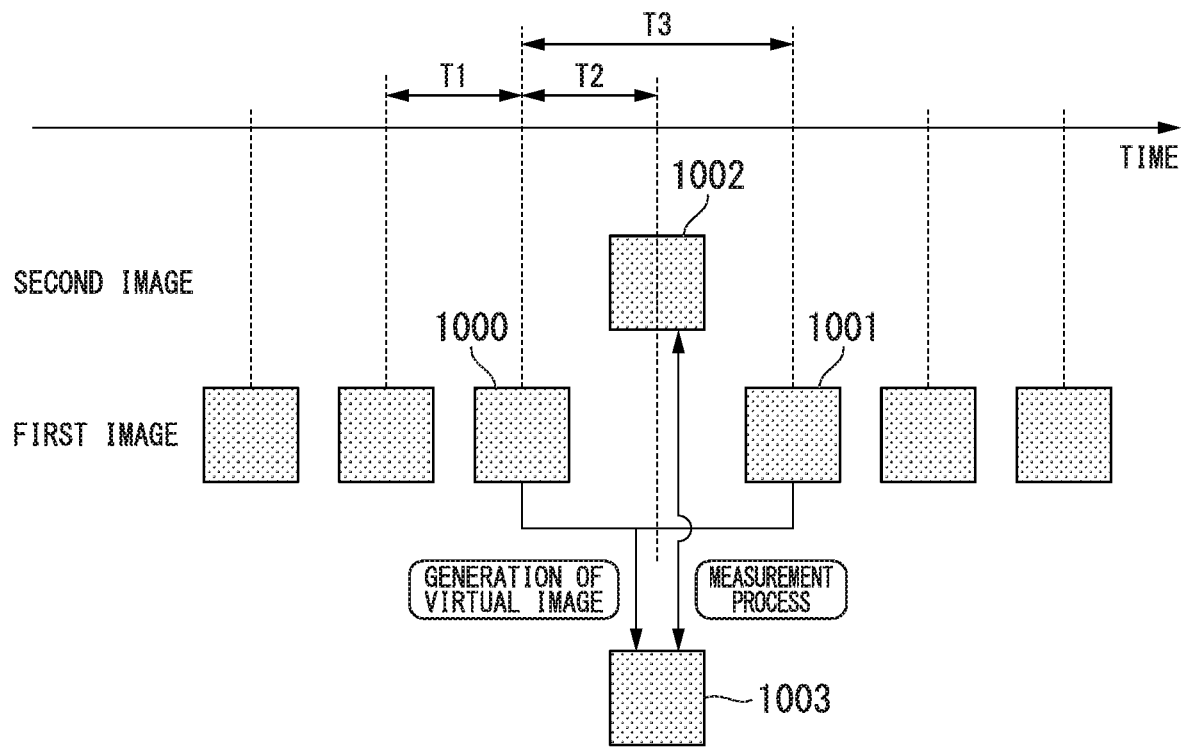
FIG. 10 is a timing chart showing an imaging sequence according to the first embodiment of the present invention.

FIG. 10 shows an imaging sequence according to the first embodiment. In FIG. 10, a first imaging timing for the imaging device 104 to acquire a first image and a second imaging timing for the imaging device 104 to acquire a second image are shown. In FIG. 10, the horizontal direction represents the time. Before and after the acquisition of the second image, first images are acquired at the interval of a time T1. A difference between the first imaging timing and the second imaging timing is T2. A difference between the first imaging timing immediately before the second imaging timing and the first imaging timing immediately after the second imaging timing is T3.

The image positional deviation calculating unit 1080 calculates a positional deviation amount on the basis of a first image 1000 acquired immediately before the second imaging timing and a first image 1001 acquired immediately after the second imaging timing. The position estimating unit 1081 calculates the imaging position of the first image at the first imaging timing at which the first image 1000 has been acquired and the imaging position of the first image at the second imaging timing at which a second image 1002 has been acquired. The correction parameter calculating unit 1082 calculates a difference between such imaging positions, thereby calculating a correction parameter. The image correcting unit 1083 corrects the first image 1000 on the basis of the correction parameter, thereby generating a virtual image 1003. The image correcting unit 1083 may generate a virtual image 1003 by correcting the first image 1001 on the basis of the correction parameter.

In the first embodiment, the virtual image generating unit 108 generates a virtual image based on the first subject image acquired in a case in which the imaging device 104 is assumed to capture the first subject image at the second imaging timing. The measurement processing unit 109 measures the shape of the subject on the basis of the second image and the virtual image. In this way, the measuring device 10 can perform measurement with desired accuracy.

In a case in which shaking of the scope 110 occurs in the sequence of acquiring an image, the measuring device 10 estimates the motion of the scope 110 and corrects the first image on the basis of the motion. In this way, the measuring device 10 can secure the measurement accuracy. Also in a case in which the shaking of the scope 110 occurs, the measurement accuracy can be more easily improved than a case in which measurement is performed using the first image acquired at the first imaging timing and the second image acquired at the second imaging timing.

(First Modified Example of First Embodiment)

Figure 11:
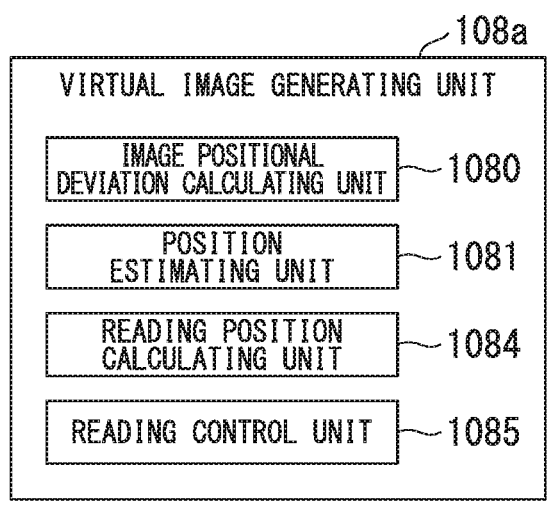
FIG. 11 is a block diagram showing the configuration of a virtual image generating unit included in a measuring device according to a first modified example of the first embodiment of the present invention.

FIG. 11 shows the configuration of a virtual image generating unit 108a of a measuring device 10 according to a first modified example of the first embodiment. Points of the configuration shown in FIG. 11 that are different from the configuration shown in FIG. 2 will be described.

The virtual image generating unit 108a includes an image positional deviation calculating unit 1080, a position estimating unit 1081, a reading position calculating unit 1084, and a reading control unit 1085. The image positional deviation calculating unit 1080 is the same as the image positional deviation calculating unit 1080 shown in FIG. 2. The position estimating unit 1081 is the same as the position estimating unit 1081 shown in FIG. 2. The reading position calculating unit 1084 calculates a reading position at the time of reading a first image that is a reading target from a frame memory 107 on the basis of the imaging position estimated by the position estimating unit 1081. The reading control unit 1085 controls reading a first image that is a reading target from the frame memory 107 as a virtual image on the basis of the calculated reading position.

In the configuration shown in FIG. 11, the other points are similar to those of the configuration shown in FIG. 2.

A subject shape measuring process according to the first modified example of the first embodiment is similar to the subject shape measuring process shown in FIG. 3 except for the following points. In Step S109, the reading position calculating unit 1084 calculates a correction parameter used for correcting the reading position of a first image by performing a process similar to the process performed by the correction parameter calculating unit 1082. The reading position calculating unit 1084 calculates a new reading position acquired by shifting the reading position of the first image on the basis of the correction parameter. In this way, the reading position of the first image in the frame memory 107 is shifted with respect to a reference position by an amount corresponding to the correction parameter. The reference position is a reading position at the time of reading a first image from the frame memory 107 for calculating a positional deviation amount. The reading position calculating unit 1084 outputs the calculated reading position. In Step S109, the reading control unit 1085 controls reading a first image from a position shifted from the reference position in the frame memory 107. The first image read from the frame memory 107 configures a virtual image.

Also in the first modified example of the first embodiment, the measuring device 10 can perform measurement with desired accuracy.

(Second Embodiment)

In the first embodiment, by compensating for a positional deviation of an image caused by a motion of the scope 110, measurement can be performed also in a case in which the motion of the scope 110 is present. In a second embodiment, execution control of a measurement process is performed in accordance with a result of estimation of the motion of the scope 110.

Figure 12:
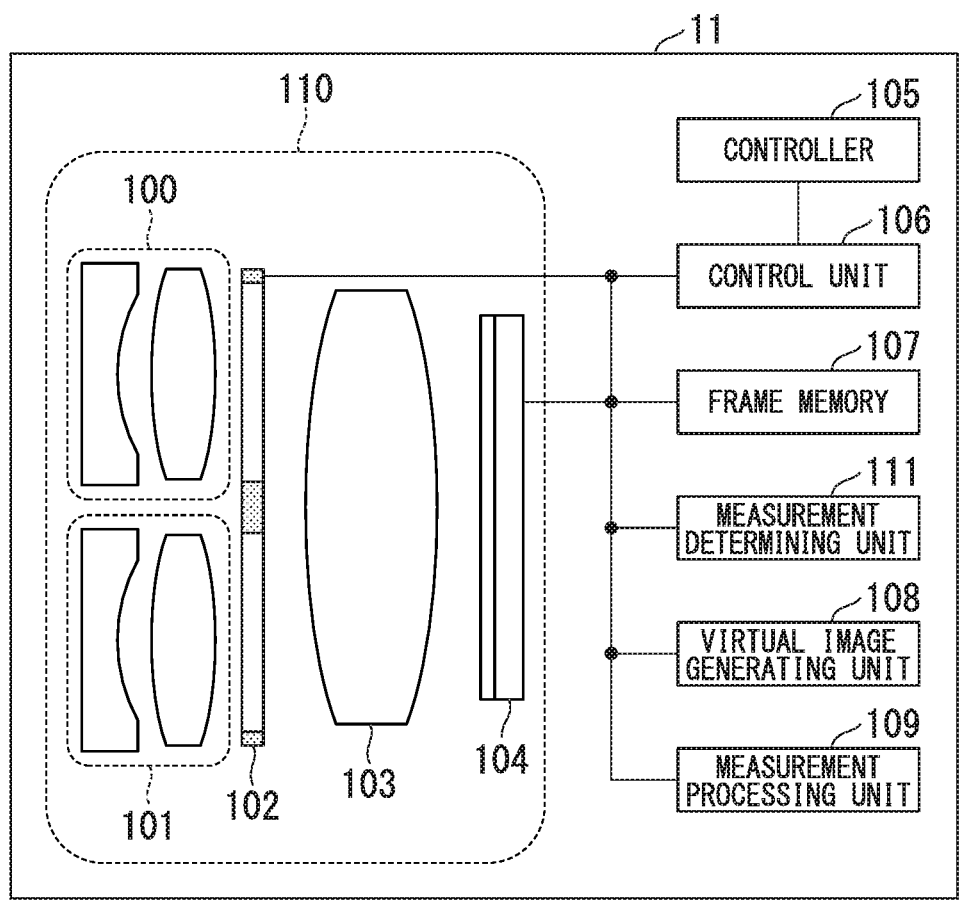
FIG. 12 is a block diagram showing the configuration of a measuring device according to a second embodiment of the present invention.

FIG. 12 shows the configuration of a measuring device 11 according to the second embodiment of the present invention. In the configuration shown in FIG. 12, points different from those of the configuration shown in FIG. 1 will be described.

The measuring device 11 includes a measurement determining unit 111 in addition to the configuration of the measuring device 10 shown in FIG. 1. The measurement determining unit 111 determines whether or not measurement can be performed on the basis of a positional deviation amount before a virtual image is generated. The measurement determining unit 111 determines whether or not measurement can be performed on the basis of at least one of a translational movement amount of an imaging device 104 based on the positional deviation amount, a value representing straight movement property of the imaging device 104 based on the positional deviation amount, and an amount of change of the positional deviation amount. In a case in which the measurement determining unit 111 determines that measurement can be performed, a virtual image generating unit 108 generates a virtual image.

In the configuration shown in FIG. 12, the other points are similar to those of the configuration shown in FIG. 1.

Figure 13:
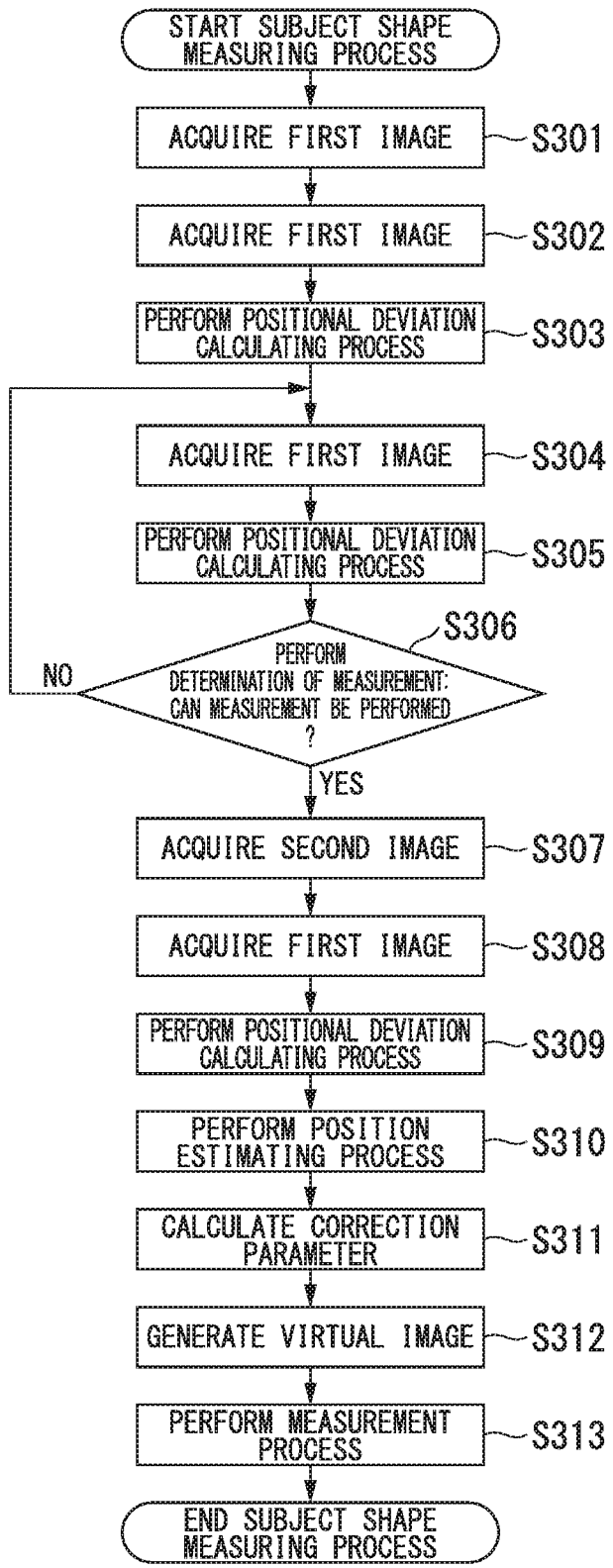
FIG. 13 is a flowchart showing the sequence of a subject shape measuring process according to the second embodiment of the present invention.

FIG. 13 shows the sequence of a subject shape measuring process according to the second embodiment. The subject shape measuring process will be described in detail with reference to FIG. 13.

After the subject shape measuring process is started, the optical path switching unit 102 sets the first optical path for the optical path. Accordingly, a first subject image based on light passing through the first objective optical system 100 is formed on the surface of the imaging device 104. The imaging device 104 captures a first subject image and generates a first image based on the first subject image. A timing at which the first subject image is captured is a first timing. The first image generated by the imaging device 104 is stored in a frame memory 107 (Step S301).

After Step S301, the imaging device 104 captures the first subject image again, thereby generating a first image based on the first subject image. The first image generated by the imaging device 104 is stored in the frame memory 107 (Step S302). In other words, in Step S301 and Step S302, the imaging device 104 continuously captures the first subject image, thereby generating two first images.

After Step S302, the image positional deviation calculating unit 1080 calculates a positional deviation amount between the two first images generated in Step S301 and Step S302 (Step S303). Details of the process of Step S303 are similar to those of the process shown in FIG. 4.

After Step S303, the imaging device 104 captures the first subject image again, thereby generating a first image based on the first subject image. The first image generated by the imaging device 104 is stored in the frame memory 107 (Step S304).

After Step S304, the image positional deviation calculating unit 1080 calculates a positional deviation amount between the two first images (Step S305). When the process in Step S305 is performed for the first time, the first images used in Step S305 are the two first images generated in Step S302 and Step S304. When the process in Step S305 following the process in Step S305 for the first time is performed, the first images used in Step S305 are two first images generated by repeating the process of Step S304. Details of the process of Step S305 are similar to those of the process shown in FIG. 4.

After Step S305, the measurement determining unit 111 determines whether or not measurement can be performed on the basis of the positional deviation amount (Step S306). When the process in Step S306 is performed for the first time, the positional deviation amount used in Step S306 is two positional deviation amounts calculated in Step S303 and Step S305. When the process in Step S306 following the process in Step S306 for the first time is performed, the positional deviation amounts used in Step S306 are two positional deviation amounts calculated by repeating the process of Step S305.

On the other hand, in a case in which it is determined that measurement cannot be performed in Step S306, the process of Step S304 is performed. In a case in which measurement cannot be performed, the acquisition of a first image (Step S304), the positional deviation calculating process (Step S305), and the measurement determining process (Step S306) are repeated.

In a case in which it is determined that measurement can be performed in Step S306, the optical path switching unit 102 sets the second optical path for the optical path. Accordingly, a second subject image based on light passing through the second objective optical system 101 is formed on the surface of the imaging device 104. The imaging device 104 captures the second subject image, thereby generating a second image based on the second subject image. The second image generated by the imaging device 104 is stored in the frame memory 107 (Step S307).

After Step S307, a process similar to the process of Step S301 is performed. In other words, acquisition of a first image is performed (Step S308).

After Step S308, the processes of Step S309, Step S310, Step S311, Step S312, and Step S313 are sequentially performed. The processes of Step S309 to Step S313 are similar to the processes of Step S106 to Step S110 shown in FIG. 3. First images used in Step S309 are the two first images generated in Step S304 and Step S308. A positional deviation amount used in Step S310 is a positional deviation amount calculated in Step S309. By performing the process of Step S313, the subject shape measuring process is completed.

Figure 14:
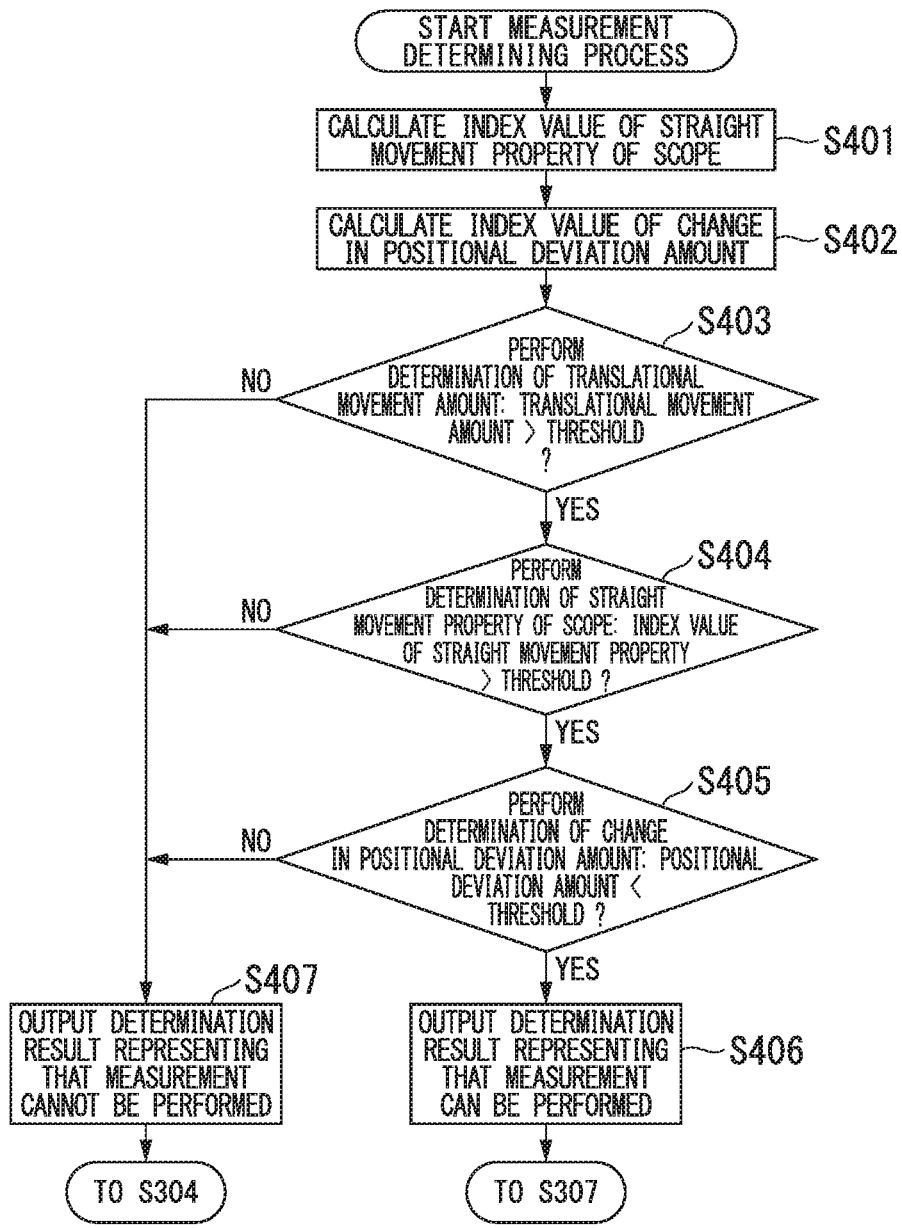
FIG. 14 is a flowchart showing the sequence of a measurement determining process according to the second embodiment of the present invention.

FIG. 14 shows the sequence of the measurement determining process performed in Step S306. The measurement determining process will be described in detail with reference to FIG. 14.

After the measurement determining process is started, the measurement determining unit 111 calculates an index value of straight movement property of the scope 110 (Step S401). This index value represents the straight movement property of the imaging device 104. More specifically, the measurement determining unit 111 compares a plurality of positional deviation amounts with each other and quantifies the degree of change in the vector direction thereof. In this way, the measurement determining unit 111 calculates an index value $f_s$ of the straight movement property of the scope 110 given in Equation (16).

$$f_S = \left| \frac{V_t \cdot V_{t-1}}{|V_t| \cdot |V_{t-1}|} \right|, t = 1, 2, 3, \cdots, T \quad (16)$$

In Equation (16), $V_t$ is a positional deviation amount calculated by the image positional deviation calculating unit 1080. A positional deviation amount $V_1$ is calculated in Step S303. In addition, positional deviation amounts $V_2, V_3, \ldots, V_T$ are calculated in Step S305. Two positional deviation amounts calculated at timings nearest a timing at which the measurement determining process is performed are used in Step S401.

After Step S401, the measurement determining unit 111 calculates an index value of a change in the positional deviation amount (Step S402). The index value of the change in the positional deviation amount is the amount of change in the positional deviation amount. More specifically, the measurement determining unit 111 quantifies the degree of a change in the magnitude of the positional deviation amount, thereby calculating an index value $f_d$ of the change in the positional deviation amount given in Equation (17).

$$f_d = |V_t| - |V_{t-1}|, t = 1, 2, 3, \ldots, T \quad (17)$$

Figure 15A:
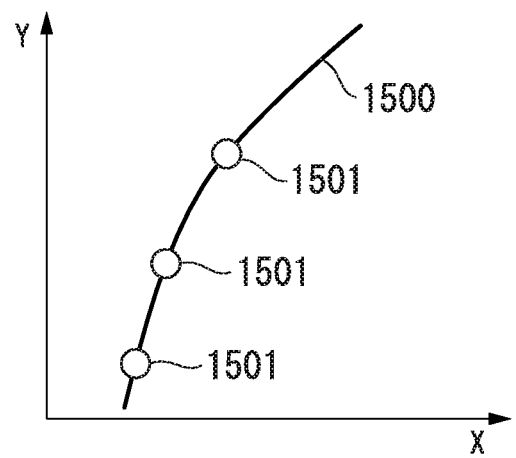
FIGS. 15A to 15C are graphs showing examples of a behavior of a scope according to the second embodiment of the present invention.
Figure 15B:
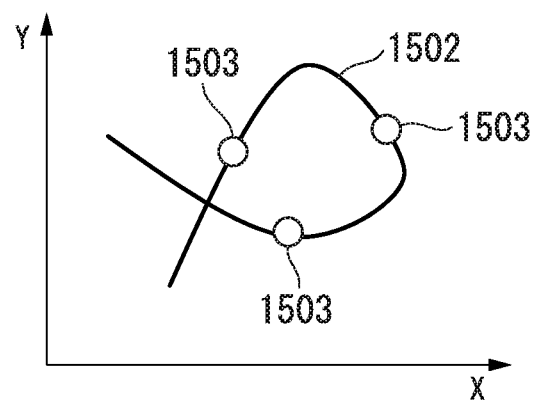
Figure 15C:
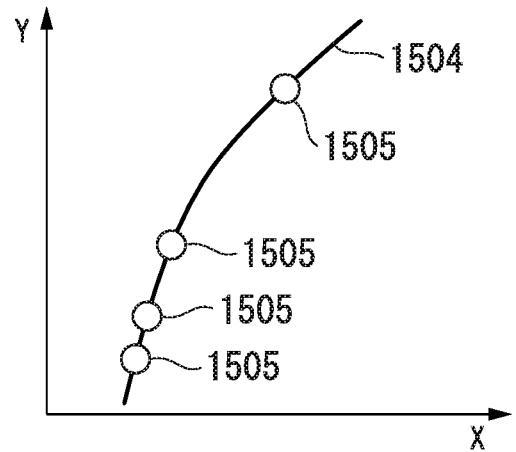

By using the index value $f_s$ and the index value $f_d$ described above, the behavior of the scope 110 in the coordinate system of the scope 110 shown in FIG. 6 can be represented. FIGS. 15A to 15C show examples of various behaviors of the scope 110. In FIGS. 15A, 15B, and 15C, the trajectories of the scope 110 are shown as graphs. The horizontal axis of each of the graphs represents X coordinates, and the vertical axis of each of the graphs represents Y coordinates. In each of the graphs, the imaging positions of the first image and the second image are shown.

In a case in which the scope 110 moves linearly at a uniform speed, the behavior of the scope 110 is represented in a trajectory 1500 shown in FIG. 15A. In this case, the intervals between imaging positions 1501 in two consecutive times of imaging are approximately the same. In a case in which the scope 110 does not move linearly, the behavior of the scope 110 is represented in a trajectory 1502 shown in FIG. 15B. In this case, the intervals between imaging positions 1503 in two consecutive times of imaging are not necessarily the same. In a case in which the scope 110 moves linearly at a non-uniform speed, the behavior of the scope 110 is represented in a trajectory 1504 shown in FIG. 15C. In this case, the intervals between imaging positions 1505 in two consecutive times of imaging are not necessarily the same.

After Step S402, the measurement determining unit 111 determines whether or not the translational movement amount of the scope 110 is smaller than a predetermined threshold by comparing the translational movement amount of the scope 110 with the predetermined threshold (Step S403). The translational movement amount of the scope 110 is a positional deviation amount $V_t$ calculated at a timing nearest a timing at which the measurement determining process is performed. In other words, in Step S305, the image positional deviation calculating unit 1080 calculates the translational movement amount of the scope 110. The determination performed in Step S403 is performed for the purpose of extracting a timing at which the shaking of the scope 110 is small.

In a case in which the translational movement amount of the scope 110 is the predetermined threshold or more in Step S403, the measurement determining unit 111 outputs a determination result representing that measurement cannot be performed (Step S407). By performing the process of Step S407, the measurement determining process is completed. After Step S407, the process of Step S304 is performed.

In a case in which the translational movement amount of the scope 110 is smaller than the predetermined threshold in Step S403, the measurement determining unit 111 determines whether or not the index value $f_s$ of straight movement property of the scope 110 is larger than a predetermined threshold by comparing the index value $f_s$ of the straight movement property of the scope 110 with the predetermined threshold (Step S404). The determination in Step S404 is performed for the purpose of allowing a case in which the scope 110 moves linearly and excluding a case in which the moving direction of the scope 110 abruptly changes.

In a case in which the index value $f_s$ of the straight movement property of the scope 110 is the predetermined threshold or less in Step S404, the process of Step S407 is performed. On the other hand, in a case in which the index value $f_s$ of the straight movement property of the scope 110 is larger than the predetermined threshold in Step S404, the measurement determining unit 111 determines whether or not an index value $f_d$ of a change in the positional deviation amount is smaller than a predetermined threshold by comparing the index value $f_d$ of the change in the positional deviation amount with the predetermined threshold (Step S405). The determination performed in Step S405 is performed for the purpose of allowing a case in which the scope 110 moves at a uniform speed and excluding a case in which the scope 110 is accelerated or decelerated.

In a case in which the index value $f_d$ of a change in the positional deviation amount is the predetermined threshold or more in Step S405, the process of Step S407 is performed. On the other hand, in a case in which the index value $f_d$ of a change in the positional deviation amount is smaller than the predetermined threshold in Step S405, the measurement determining unit 111 outputs a determination result representing that measurement can be performed (Step S406). By performing the process of Step S406, the measurement determining process is completed. After Step S406, the process of Step S307 is performed.

The thresholds used in the processes of Step S403, Step S404, and Step S405 do not need to be the same. At least one of Step S401 and Step S402 may be performed by a calculation unit different from the measurement determining unit 111. The processing order of Step S403, Step S404, and Step S405 is not limited to the order shown in FIG. 14.

FIGS. 16A to 16D show examples of the behavior of the scope 110. In FIGS. 16A, 16B, 16C, and 16D, the trajectories of the scope 110 are represented as graphs. The horizontal axis of each of the graphs represents X coordinates, and the vertical axis of each of the graphs represents Y coordinates. In each of the graphs, the imaging positions of the first image and the second image are shown.

Figure 16A:
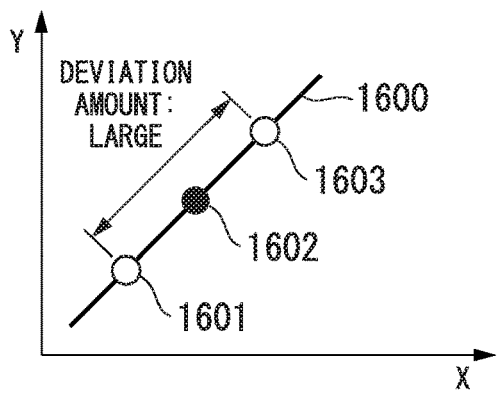
FIGS. 16A to 16D are graphs showing examples of a behavior of a scope according to the second embodiment of the present invention.

In a trajectory 1600 shown in FIG. 16A, the scope 110 moves linearly at a uniform speed. First images are generated through imaging at an imaging position 1601 and imaging at an imaging position 1603. A second image is generated through imaging at an imaging position 1602. An interval between the imaging position 1601 of the first image and the imaging position 1603 of the first image is large. In other words, the shaking of the scope 110 is large.

Figure 16B:
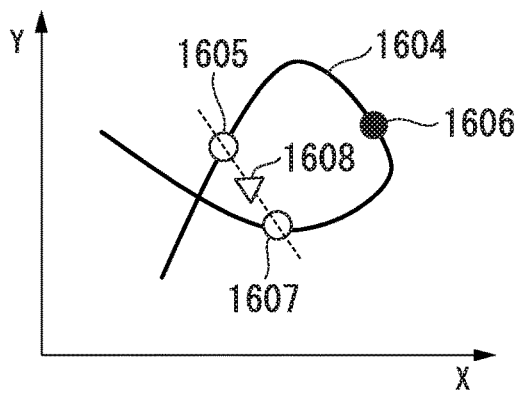

In a trajectory 1604 shown in FIG. 16B, the scope 110 does not move linearly. First images are generated through imaging at an imaging position 1605 and imaging at an imaging position 1607. A second image is generated through imaging at an imaging position 1606. An imaging position 1608 of the first image corresponding to the imaging position 1606 of the second image is calculated on the basis of the imaging position 1605 and the imaging position 1607. The imaging position 1608 of the first image is much different from the imaging position 1606 of the second image.

Figure 16C:
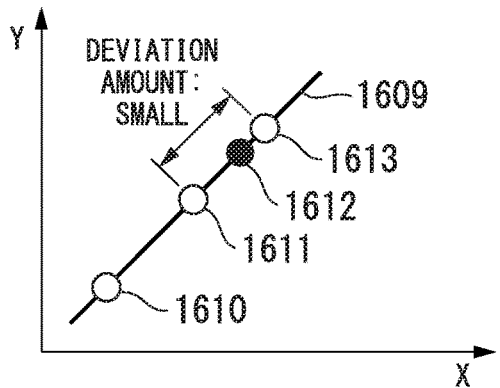

In a trajectory 1609 shown in FIG. 16C, the scope 110 moves linearly at a non-uniform speed. First images are generated through imaging at an imaging position 1610, imaging at an imaging position 1611, and imaging at an imaging position 1613. A second image is generated through imaging at an imaging position 1612. An interval between the imaging position 1611 of the first image and the imaging position 1613 of the first image is small. In other words, the shaking of the scope 110 is small. Since the speed of the scope 110 abruptly changes, an interval between the imaging position 1611 of the first image and the imaging position 1612 of the second image is different from an interval between the imaging position 1612 of the second image and the imaging position 1613 of the first image.

Figure 16D:
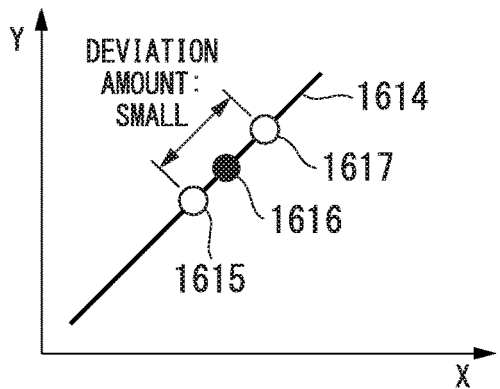

In a trajectory 1614 shown in FIG. 16D, the scope 110 moves linearly at a uniform speed. First images are generated through imaging at an imaging position 1615 and imaging at an imaging position 1617. A second image is generated through imaging at an imaging position 1616. An interval between the imaging position 1615 of the first image and the imaging position 1617 of the first image is small. In other words, the shaking of the scope 110 is small.

The measurement determining unit 111 determines a translational movement amount (Step S403), whereby a case (FIG. 16A) in which the shaking of the scope 110 is large is excluded. The measurement determining unit 111 determines the straight movement property of the scope 110 (Step S404), whereby a case (FIG. 16B) in which the moving direction of the scope 110 changes is excluded. The measurement determining unit 111 determines an amount of change of the positional deviation amount (Step S405), whereby a case (FIG. 16C) in which the speed of the scope 110 abruptly changes is excluded. In the process shown in FIG. 14, a measurement process is performed in a case (FIG. 16D) in which the shaking of the scope 110 is small, the movement of the scope 110 is linear, and the motion of the scope 110 is small and constant. Accordingly, the accuracy of the compensation for the positional deviation of an image due to the motion of the scope 110 is improved.

Figure 17:
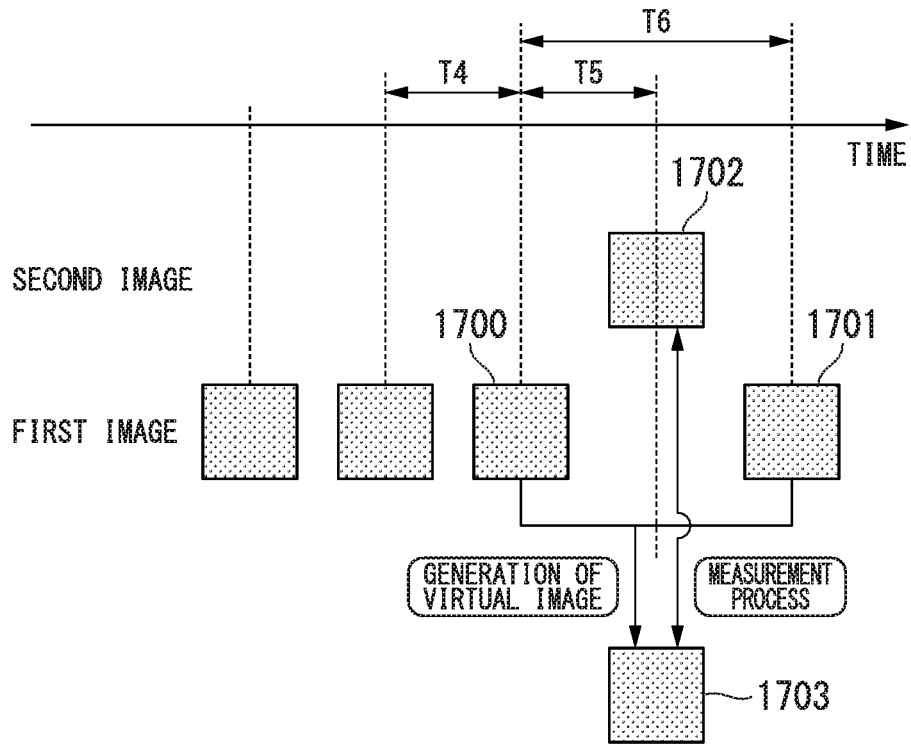
FIG. 17 is a timing chart showing an imaging sequence according to the second embodiment of the present invention.

FIG. 17 shows an imaging sequence according to the second embodiment. In FIG. 17, a first imaging timing for the imaging device 104 to acquire a first image and a second imaging timing for the imaging device 104 to acquire a second image are shown. In FIG. 17, the horizontal direction represents the time. Before and after the acquisition of the second image, first images are acquired at the interval of a time T4. A difference between the first imaging timing and the second imaging timing is T5. A difference between the first imaging timing immediately before the second imaging timing and the first imaging timing immediately after the second imaging timing is T6.

The image positional deviation calculating unit 1080 calculates a positional deviation amount on the basis of a first image 1700 acquired immediately before the second imaging timing and a first image 1701 acquired immediately after the second imaging timing. The position estimating unit 1081 calculates the imaging position of the first image at the first imaging timing at which the first image 1700 is acquired and the imaging position of the first image at the second imaging timing at which the second image 1702 is acquired. The correction parameter calculating unit 1082 calculates a correction parameter by calculating a difference between such imaging positions. The image correcting unit 1083 generates a virtual image 1703 by correcting the first image 1700 on the basis of the correction parameter. The image correcting unit 1083 may generate the virtual image 1703 by correcting the first image 1701 on the basis of the correction parameter.

In the second embodiment, in a case in which the measurement determining unit 111 determines that measurement can be performed, the generation of a virtual image and a measurement process are performed. For this reason, the measurement accuracy is improved. In addition, also in a state in which the scope 110 does not completely stop, the measuring device 11 can perform a measurement process. For this reason, the measuring device 11 can maintain the measurement accuracy and can increase the execution frequency at which the measurement process is performed.

(First Modified Example of Second Embodiment)

Figure 18:
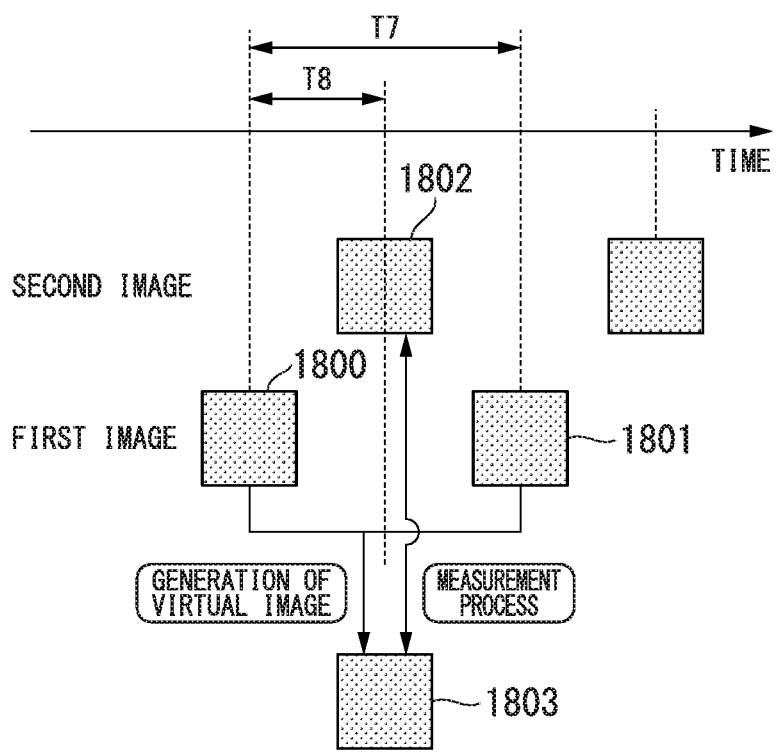
FIG. 18 is a timing chart showing an imaging sequence according to a first modified example of the second embodiment of the present invention.

FIG. 18 shows an imaging sequence according to a first modified example of the second embodiment. In FIG. 18, a first imaging timing for the imaging device 104 to acquire a first image and a second imaging timing for the imaging device 104 to acquire a second image are shown. In FIG. 18, the horizontal direction represents the time. In the imaging sequence shown in FIG. 17, the first images are consecutively acquired before and after the acquisition of the second image. In contrast to this, in the imaging sequence shown in FIG. 18, a first image and a second image are alternately acquired. First images are acquired at the interval of a time T7, and the second images are acquired at the interval of the time T7. A difference between the first imaging timing and the second imaging timing is T8.

The image positional deviation calculating unit 1080 calculates a positional deviation amount on the basis of a first image 1800 acquired immediately before the second imaging timing and a first image 1801 acquired immediately after the second imaging timing. The position estimating unit 1081 calculates the imaging position of the first image at the first imaging timing at which the first image 1800 is acquired and the imaging position of the first image at the second imaging timing at which the second image 1802 is acquired. The correction parameter calculating unit 1082 calculates a correction parameter by calculating a difference between such imaging positions. The image correcting unit 1083 generates a virtual image 1803 by correcting the first image 1800 on the basis of the correction parameter. The image correcting unit 1083 may generate the virtual image 1803 by correcting the first image 1801 on the basis of the correction parameter.

Also in the first modified example of the second embodiment, the measuring device 11 can perform measurement with desired accuracy.

(Second Modified Example of Second Embodiment)

Figure 19:
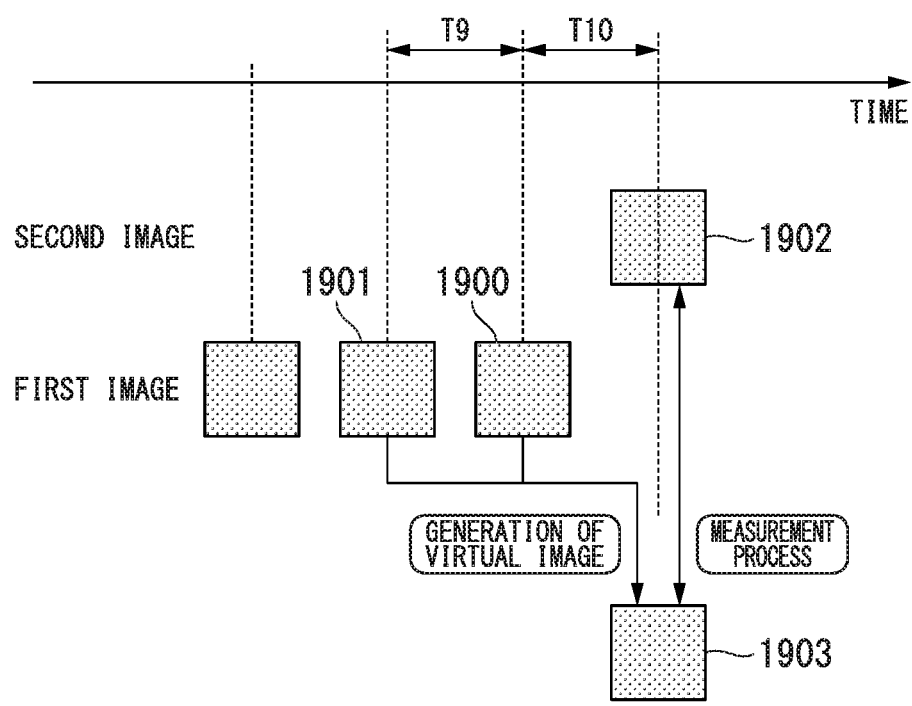
FIG. 19 is a timing chart showing an imaging sequence according to a second modified example of the second embodiment of the present invention.

FIG. 19 shows an imaging sequence according to a second modified example of the second embodiment. In FIG. 19, a first imaging timing for the imaging device 104 to acquire a first image and a second imaging timing for the imaging device 104 to acquire a second image are shown. In FIG. 19, the horizontal direction represents the time. In the imaging sequence shown in FIG. 17, the first images are consecutively acquired before and after the acquisition of the second image. In contrast to this, in the imaging sequence shown in FIG. 19, one second image is acquired after first images are consecutively acquired. After the second image is acquired, a first image is not acquired. First images are acquired at the interval of a time T9. A difference between the first imaging timing and the second imaging timing is T10.

The image positional deviation calculating unit 1080 calculates a positional deviation amount on the basis of a first image 1900 acquired immediately before the second imaging timing and a first image 1901 acquired immediately before that. The position estimating unit 1081 calculates the imaging position of the first image at the first imaging timing at which the first image 1900 is acquired and the imaging position of the first image at the second imaging timing at which the second image 1902 is acquired. The correction parameter calculating unit 1082 calculates a correction parameter by calculating a difference between such imaging positions. The image correcting unit 1083 generates a virtual image 1903 by correcting the first image 1900 on the basis of the correction parameter. The image correcting unit 1083 may generate the virtual image 1903 by correcting the first image 1901 on the basis of the correction parameter.

In the imaging sequence shown in FIG. 17, a positional deviation amount is calculated from two first images acquired at the first imaging timings before and after the second imaging timing, and a virtual imaging position of the first image at the second imaging timing is calculated on the basis of the positional deviation amount. The virtual imaging position of the first image is calculated by performing internal insertion of the imaging position at the first imaging timings before and after the second imaging timing. In the imaging sequence shown in FIG. 19, a positional deviation amount is calculated from two first images acquired at first imaging timings before the second imaging timing, and a virtual imaging position of the first image at the second imaging timing is calculated on the basis of the positional deviation amount. The virtual imaging position of the first image is calculated by external insertion of the imaging position at the first imaging timing before the second imaging timing.

Also in the second modified example of the second embodiment, the measuring device 11 can perform measurement with desired accuracy.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A measuring device, comprising:
   a first objective optical system;
   a second objective optical system arranged to have a parallax with respect to the first objective optical system;
   an image sensor; and
   a processor configured to:
      control the image sensor to:
         capture a plurality of first subject images formed through the first objective optical system at a plurality of first imaging timings;
         capture a second subject image formed through the second objective optical system at a second imaging timing different from the plurality of first imaging timings;
         generate a plurality of first images based on the plurality of first subject images; and
         generate a second image based on the second subject image;
      calculate a positional deviation amount among all or a part of the plurality of the first images;
      correct one of the plurality of first images based on the positional deviation amount calculated to generate a virtual image that is an estimation of a first image generated based on a first subject image formed through the first objective optical system at the second imaging timing captured by the image sensor; and
      measure a shape of a subject on the basis of the second image and the virtual image.

2. The measuring device according to claim 1,
   wherein the processor is configured to:
      estimate an imaging position of the first image generated based on the first subject image formed through the first objective optical system at the second imaging timing captured by the image sensor based on the positional deviation amount calculated;
      calculate a correction parameter for the one of the plurality of first images, that is a correction target, based on the imaging position estimated; and
      correct the one of the plurality of first images, that is the correction target, using the correction parameter calculated to generate the virtual image.

3. The measuring device according to claim 1,
   wherein the processor is configured to calculate the positional deviation amount among the first image of the plurality of first images generated based on the first subject image of the plurality of first subject images captured at the first imaging timing of the plurality of imaging timings immediately before the second imaging timing and the first image of the plurality of first images generated based on the first subject image of the plurality of first subject images captured at the first imaging timing of the plurality of imaging timings immediately after the second imaging timing.

4. The measuring device according to claim 1, further comprising a memory configured to store the plurality of the first images,
   wherein the processor is configured to:
      estimate an imaging position of the first subject image formed through the first objective optical system at the second imaging timing captured by the image sensor;
      calculate a reading position at the time of reading a first image that is a reading target from the memory based on the imaging position estimated;
      calculate a correction parameter for correcting the reading position;

shift the reading position by the correction parameter; and correct the one of the plurality of first images by reading the first image that is the reading target at the reading position that is shifted from the memory to generate the virtual image.

5. The measuring device according to claim 1, wherein the processor is configured to:
   determine whether or not measurement can be performed based on the positional deviation amount before the virtual image is generated; and
   in response to determining that measurement can be performed, generate the virtual image.

6. The measuring device according to claim 5, wherein the processor is configured to:
   determine whether or not the measurement can be performed based on at least one of a translational movement amount of the image sensor based on the positional deviation amount, a value representing straight movement property of the image sensor based on the positional deviation amount, and an amount of change of the positional deviation amount.

7. An operating method of a measuring device comprising:
   a first objective optical system;
   a second objective optical system arranged to have a parallax with respect to the first objective optical system; and
   an image sensor,
   the operating method comprising:
   controlling the image sensor to:
      capture a plurality of first subject images formed through the first objective optical system at a plurality of first imaging timings;
      generate a plurality of first images based on the plurality of first subject images;
      capture a second subject image formed through the second objective optical system at a second imaging timing different from the plurality of first imaging timings; and
      generate a second image based on the second subject image;
   calculating a positional deviation amount among all or a part of the plurality of the first images;
   correcting one of the plurality of first images based on the positional deviation amount calculated to generate a virtual image that is an estimation of a first image generated based on a first subject image formed through the first objective optical system at the second imaging timing captured by the image sensor; and
   measuring a shape of a subject on the basis of the second image and the virtual image.

8. A non-transitory computer-readable storage medium storing instructions for controlling a measuring device, the measuring device comprising:
   a first objective optical system;
   a second objective optical system arranged to have a parallax with respect to the first objective optical system; and
   an image sensor,
   the instructions causing a computer to at least:
   control the image sensor to:
      capture a plurality of first subject images formed through the first objective optical system at a plurality of first imaging timings;
      capture a second subject image formed through the second objective optical system at a second imaging timing different from the plurality of first imaging timings;
      generate a plurality of first images based on the plurality of first subject images; and
      generate a second image based on the second subject image;
   calculate a positional deviation amount among all or a part of the plurality of the first images;
   correct one of the plurality of first images based on the positional deviation amount calculated to generate a virtual image that is an estimation of a first image generated based on a first subject image formed through the first objective optical system at the second imaging timing captured by the image sensor; and
   measure a shape of a subject on the basis of the second image and the virtual image.

* * * * *